United States Patent [19]
Kolvek

[11] Patent Number: 6,158,610
[45] Date of Patent: Dec. 12, 2000

[54] TWO COMPONENT FLUID DRAINING PAN

[76] Inventor: Scott Fenton Kolvek, 20 Shady La., Glen Gardner, N.J. 08826

[21] Appl. No.: 09/255,528

[22] Filed: Feb. 22, 1999

[51] Int. Cl.[7] .................................................. B65D 21/032
[52] U.S. Cl. ............................................................ 220/573
[58] Field of Search ................................. 220/4.21, 4.24, 220/4.04, 4.27, 4.26, 573, 571, 23.83, 23.86; 206/501, 514; 141/98; 184/106, 1.5

[56] References Cited

U.S. PATENT DOCUMENTS

| | | | |
|---|---|---|---|
| 2,939,603 | 6/1960 | Young | 220/4.21 |
| 3,278,074 | 10/1966 | Yamazaki . | |
| 3,281,006 | 10/1966 | Wei . | |
| 3,464,579 | 9/1969 | Asenbauer . | |
| 4,216,763 | 8/1980 | Miklas | 126/275 R |
| 4,296,838 | 10/1981 | Cohen | 184/106 |
| 4,978,023 | 12/1990 | Behlmann et al. | 220/23.6 |
| 5,172,739 | 12/1992 | Ristroph | 141/98 |
| 5,226,558 | 7/1993 | Whitney et al. | 220/571 |
| 5,381,839 | 1/1995 | Dowd | 220/573 |
| 5,402,837 | 4/1995 | Dietzen | 141/98 |
| 5,653,271 | 8/1997 | Brittain et al. | 141/98 |

*Primary Examiner*—Stephen Castellano
*Attorney, Agent, or Firm*—Kenneth P. Glynn

[57] ABSTRACT

The present invention relates to a two component fluid draining pan. It includes a bottom pan with a drain valve and an upper pan. The upper pan is used to receive draining fluid which then may be poured into the bottom pan. The bottom pan has a screen for filtering and may have a sloped bottom. The upper pan may be turned over and is adapted to be fitted into the top of the bottom pan and clasped thereto for storage.

10 Claims, 3 Drawing Sheets

TWO COMPONENT FLUID DRAINING PAN

BACKGROUND OF THE INVENTION

Field of the Invention

The Fluid Pan Deluxe will be used in the field of draining all sorts of liquids including but not limited to motor oil, transmission fluid, hydraulic fluid and water. This design will facilitate the draining of these fluids into containers without having to use funnels or other messy devices.

INFORMATION DISCLOSURE STATEMENT

There are current problems of existing pans on the market today including the fact that if they do contain a pour spout, the pour spout is either too wide to fit into containers with bottle neck openings less than 0.5 inch wide. Thus they require a funnel to drain these liquids back into the containers and is a process that is clumsy and messy and results in needed clean up. The use of the existing attached pour spouts are difficult because the opening are large and require a funnel to pour the fluid into the containers and/or usually results in spills around the container. In addition, either with the pour spout or the funnel, it is difficult to measure how full the container is that you are filling up (as both hands are being used to pour the oil and hold the funnel). In addition, as pans are sold individually, it is necessary to buy two pans in order to perform draining of fluids in two different locations (ie: draining the oil from the pan as well as the oil filter). Even in cases where the pans are very wide, there is a good chance the pan is not wide enough and oil will inevitable drip outside of the pan onto the ground.

Existing pans today also do not contain a screen to prevent large pieces of material (that may fall into the pan) from clogging the funnel or pour spout.

BRIEF SUMMARY OF THE INVENTION

The "deluxe pans" valve allows easy monitoring and measuring of the fluid that is being drained. As the valve outlet diameter is smaller than the standard quart size, there is no need to try and hold a funnel and pan and empty container while pouring the fluid into the containers. The screen prior to the valve prevents debris from entering the valve and pour spout. The benefit of the 2 "deluxe pans" that fit together allows for multiple draining of fluids (ie: the oil pan as well as the oil filter in another location) as well as easy storage of the containers as they latch together. This prevents having to clean out the containers for many various reasons including the fear that debris may fall into it while it is in storage. This debris may either then clog up the spout or funnel and result in more messy spills. In other cases, occasionally some "debris" accidentally falls into the pan and becomes coated with the fluid. This debris can be in the form of tools, paper, dust, clothing etc.

This has the added benefit that while in storage in a convenient form, without having to clean, the fluid will drain from one container to the other.

DETAILED DESCRIPTION OF THE INVENTION

Referring now to FIGS. 1 through 4, identical parts are identically numbered.

Figure 1:
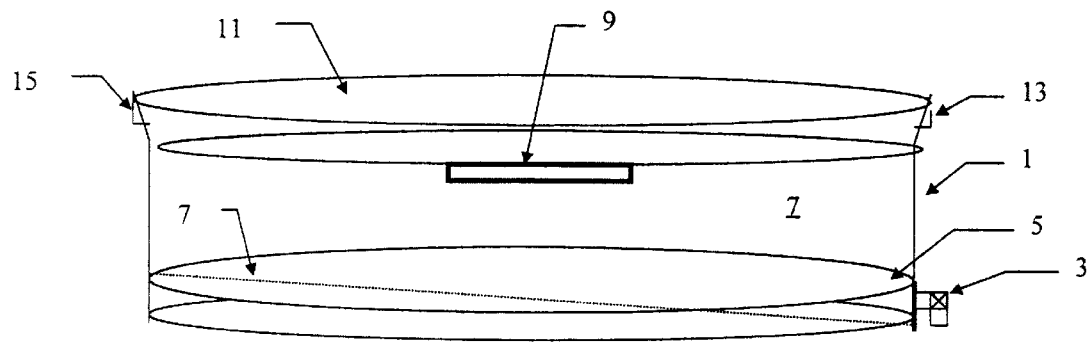
FIG. 1 illustrates an oblique front view of a present invention bottom pan.

In FIG. 1, bottom pan 1 is shown and it looks much like a regular round circular pot or bucket that would be used to hold fluid. However, it contains a valve 3 on the bottom of it. This valve 3 would typically be a ½" valve with the exit of the valve 3 pointing down and having an apr. ½" outside opening. There is a wire Mesh screen 5 that covers the general area prior to the valve 3 to prevent debris from entering the valve 3. The inside 7 of the pan can be sloped along the dotted slope to the valve 3 to allow a gravity flow of fluid in that direction without having to pick up the backside of the pan 1. There are two handles such as handle 9 on either side of the bottom pan 1 to make it easier to pick up. The top 11 of the pan 1 expands outward in diameter so that the other upper pan can fit on top of it. The oil pan structure will have various ripples along the wall as required for manufacturing ease as well as structure integrity of the pan. Also the pan 1 will have two clasps 13 and 15 on either side of the pan 1 on top 3.

Figure 2:
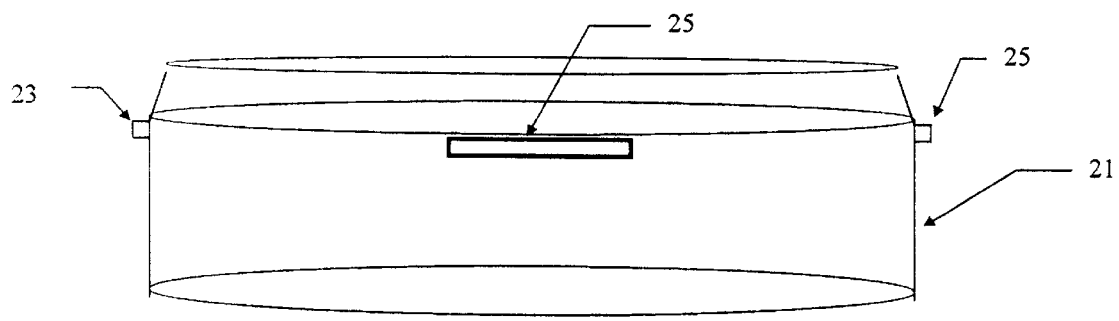
FIG. 2 shows an oblique front view of a present invention upper pan.

FIG. 2 shows upper pan 21. The upper pan 21 looks much like the bottom pan 1 in general shape. It will be slightly larger in width dimension to the bottom pan 1 so that the upper pan 21 can be turned upside down and fit into the bottom pan 1. I contains clasps 23 and 25 so that the clasp or latch of the bottom pan 21 correspond with the clasp or latch of the bottom pan 1. It also includes handles such as handle 25.

Figure 3:
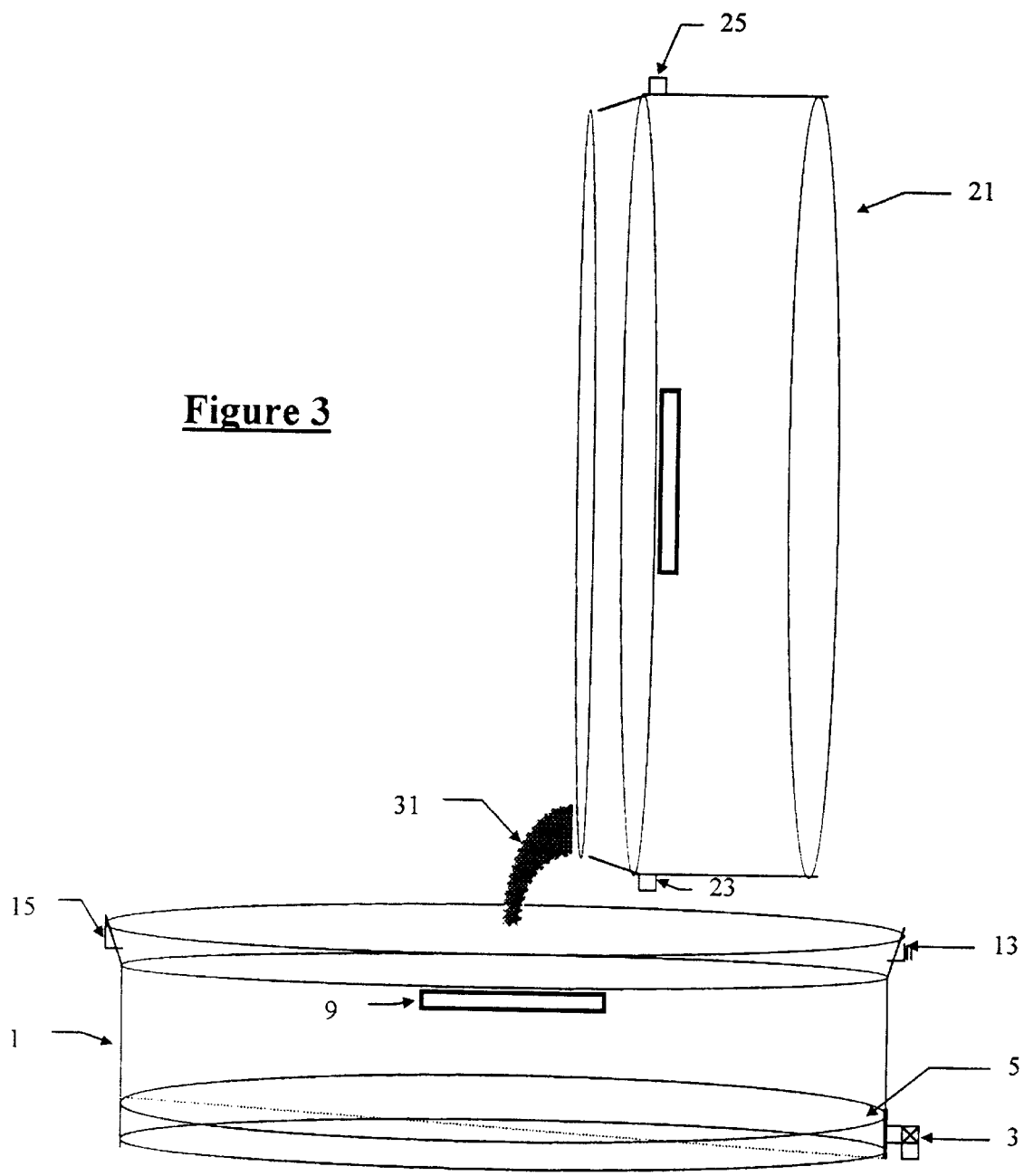
FIG. 3 illustrates an oblique front view of present invention, with fluid being poured from the upper pan to the bottom pan; and, FIG. 4 shows the upper pan of the present invention overturned to fit into the bottom pan.
Figure 4:
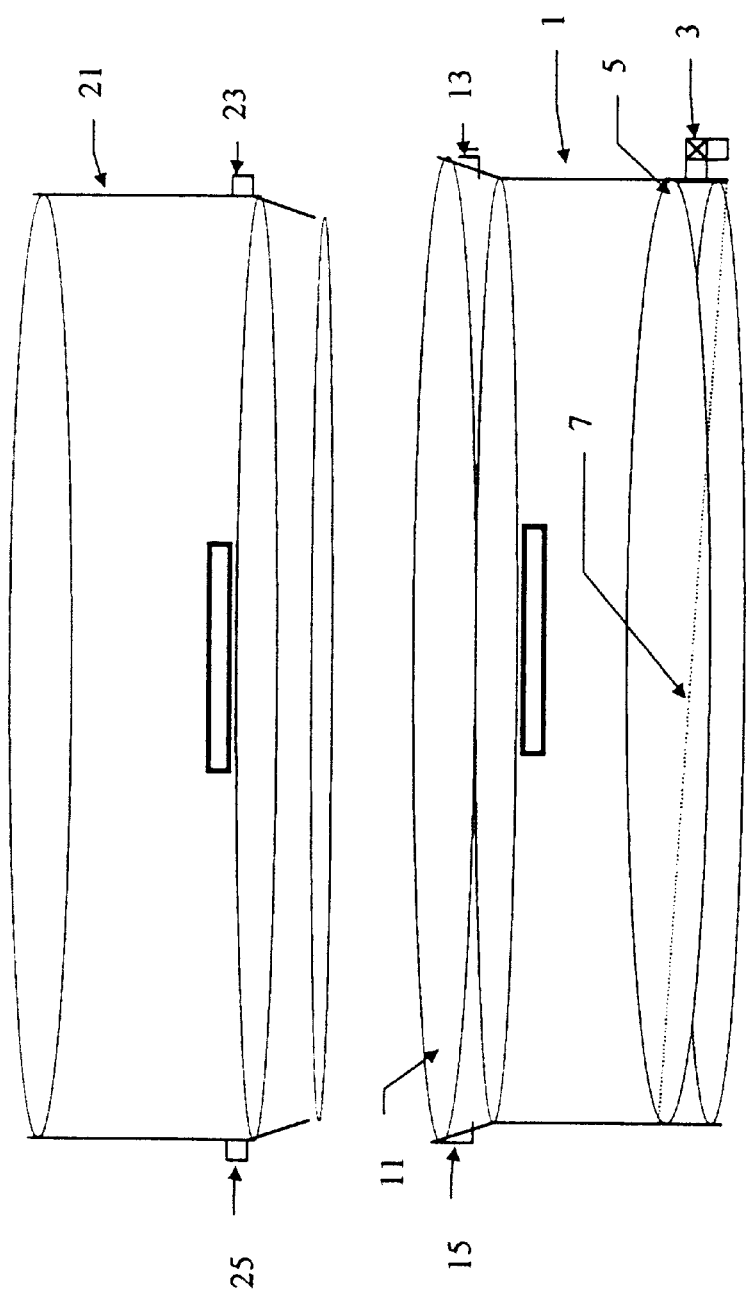

FIG. 3 illustrates an action view of the upper and bottom pans in use. This view is a basic illustration of how the upper pan 21 with fluid 31, e.g. oil, inside can be poured into the bottom pan 1 and will then be turned completely upside down as shown in FIG. 4. In FIG. 4, the upper and bottom pan combination are shown in a storage mode. Thus, this view shows how the upper pan 21 will fit into the bottom pan 1 so that the upper and bottom pans can then be clasped together with clasps 15, 13, 23 and 25, as shown. Note that actual dimensions and configurations of the pans may vary based on suitable manufacturing requirements.

The Fluid Pan Deluxe will be used in the field of draining all sorts of liquids including but not limited to motor oil, transmission fluid, hydraulic fluid and water. This design will facilitate the draining of these fluids into containers without having to use funnels or other messy devices. Specifically, this invention is distinctly different from pans on the market now because of the following: the valve (with plug) is included to facilitate draining of the fluid, the opening of the drain is approximately 0.5' wide so as to fit into standard size quarts of oil or transmission bottles and the lower pan is mated with the upper pan to have the ability to clasp them together and a screen is included to prevent debris from entering the valve or drain.

The valve is used to easily drain the fluid from the pan into containers with 0.5 inch wide openings. Some examples of fluids that come in containers with 0.5 inch wide openings include quarts of oil, transmission fluid and brake fluid. The oil pan deluxe can be placed along the edge of any table or bench to allow the valve to overhang the edge. It is easy to use one hand to rotate the valve while the hand holds the container to be filled. Once the appropriate level is achieved, the valve can easily be shut off and the cover be put on the container. A safety plug is included to ensure that fluid can not leak or drip through the valve during long term storage. The screen again prevents any debris/material that may accidentally fall into the lower pan, from clogging the drain or valve.

The deluxe pan has, as a claim, the improvement of containing a valve to facilitate the process of draining the fluid. As a second claim, the apparent most suitable valve to be utilize for this process is a standard ½" ball valve. This size valve appears to be suitable, as the exit spout needs to be apr. 0.5" wide to fit into standard size quarts of fluid.

There are current problems of existing pans on the market today including the fact that if they do contain a pour spout, the pour spout is either too wide to fit into containers with bottle neck openings less than 0.5 inch wide. Thus these existing products require a funnel to drain these liquids back into the containers and is a process that is clumsy and messy and results in needed clean up. The use of the existing attached pour spouts are difficult because the openings are large and require a funnel to pour the fluid into the containers and/or usually results in spills around the container. In addition, either with the pour spout or the funnel, it is difficult to measure how full the container is that you are filling up (as both hands are being used to pour the oil and hold the funnel). In addition, as pans are sold individually, it is necessary to buy two pans in order to perform draining of fluids in two different locations (ie: draining the oil from the pan as well as the oil filter). Even in cases where the pans are very wide, there is a good chance the pan is not wide enough and oil will inevitable drip outside of the pan onto the ground. The fluid pan deluxe will solve these problems.

The Fluid pan deluxe contains two pans and thus allows a user to drain fluid in two separate locations. As the upper pan fits into the lower pan, transfer of the fluid to the lower pan is easy. Simply just pour the fluid into the tower pan until the majority of the fluid has been transferred and then continue to rotate the upper pan upside down where it is mated with an appropriate seal to the lower pan. The clasps can be used to clamp the lower pan to the upper pan.

The wire mesh screen is located prior to the drain (and valve). The function of the wire mesh screen is to prevent debris from entering or clogging the drain or valve. The oil pan deluxe is made up of polyurethane material resistant to hydrocarbon material. This polyurethane material is typical of current regular oil pans on the market.

The ability of the upper pan to be turned upside down into the lower pan and be properly mated is new as well as being able to clasp the two pans together for storage. The ability to mate and clasp the two pans together prevents the need of cleaning out the fluid pans. This prevents having to clean out the containers for many various reasons including the fear that debris may fall into it while it is in storage. This debris may either then clog up the spout or funnel and result in more messy spills. In other cases, occasionally some "debris" accidentally falls into the pan and becomes coated with the fluid. This debris can be in the form of tools, paper, dust, clothing etc. The fluid pan deluxe can be stored in a convenient form and without having to clean, the fluid will drain from one container to the other.

What I claim as my invention is the Fluid Pan Deluxe:
1. A two component fluid draining pan, which comprises:
 (a) an upper pan having an open top, a sidewall and a bottom, said upper pan having clasp means for clasping to a bottom pan, when inverted and having said open top adapted to fit into an open top of a bottom pan, when inverted;
 (b) a bottom pan having an open top, a sidewall and a bottom, said bottom pan having clasp means for clasping with said clasp means of said upper pan when said upper pan is inverted and inserted therein, and having said open top of said bottom pan adapted to receive said open top of said upper pan when said upper pan is inverted and inserted therein;
 (c) a filtering screen located within said bottom pan; and,
 (d) a drain and drain valve located on said bottom pan and below said filtering screen.
2. The two component fluid draining pan of claim 1 wherein said upper pan and said bottom pan have round sidewalls.
3. The two component fluid draining pan of claim 2 wherein each of said upper pan and said bottom pan include handles on each of their sidewalls.
4. The two component fluid draining pan of claim 1 wherein said bottom pan has an open top which is flanged outwardly to receive said upper pan when it is inverted.
5. The two component fluid draining pan of claim 1 wherein said bottom of said bottom pan is sloped downwardly toward said drain valve.
6. The two component fluid draining pan of claim 1 wherein said drain valve is a ball valve.
7. The two component fluid draining pan of claim 6 wherein said drain valve is a half inch ball valve.
8. The two component fluid draining pan of claim 7 wherein said drain valve has a nozzle with an outer diameter of approximately five-eighths of an inch.
9. The two component fluid draining pan of claim 1 wherein each of said upper pan and said bottom pan include handles on their sidewalls.
10. The two component fluid draining pan of claim 1 wherein each of said upper pan and said bottom pan include two opposite handles on each of their sidewalls.

* * * * *